Dec. 26, 1967   H. T. JOHNSON ET AL   3,359,861

FIVE AXIS MILLING MACHINE

Original Filed Aug. 17, 1965

HARRY T. JOHNSON
EARLE H. STEVENSON
INVENTORS

BY John R. Faulkner
Thomas H. Oster

ATTORNEYS

United States Patent Office 3,359,861
Patented Dec. 26, 1967

3,359,861
FIVE AXIS MILLING MACHINE
Harry T. Johnson, Dearborn, and Earle H. Stevenson, Detroit, Mich. assignors to Ford Motor Company, Dearborn, Mich., a corporation of Delaware
Continuation of abandoned application Ser. No. 480,349, Aug. 17, 1965. This application Sept. 1, 1966, Ser. No. 577,121
3 Claims. (Cl. 90—17)

This application is a continuation of application Ser. No. 480,349, filed Aug. 17, 1965, and now abandoned.

This invention is directed to the metal cutting and forming arts and is especially concerned with a device for contouring large metal objects to irregular three dimensional profiles. This machine has been developed especially for the production of large sheet metal shaping dies which are conventionally employed in the fabrication of vehicular body parts. However, the use of this machine is by no means limited to the production of metal forming dies, but will find utility wherever it is desired to accurately contour a large mass of metal in three dimensions.

The machine taught by this invention is essentially a five axis milling machine which is arranged to enable the cutting tool to be located accurately in three dimensions and at any selected point in space and within the limits of its movements.

Figure 1:
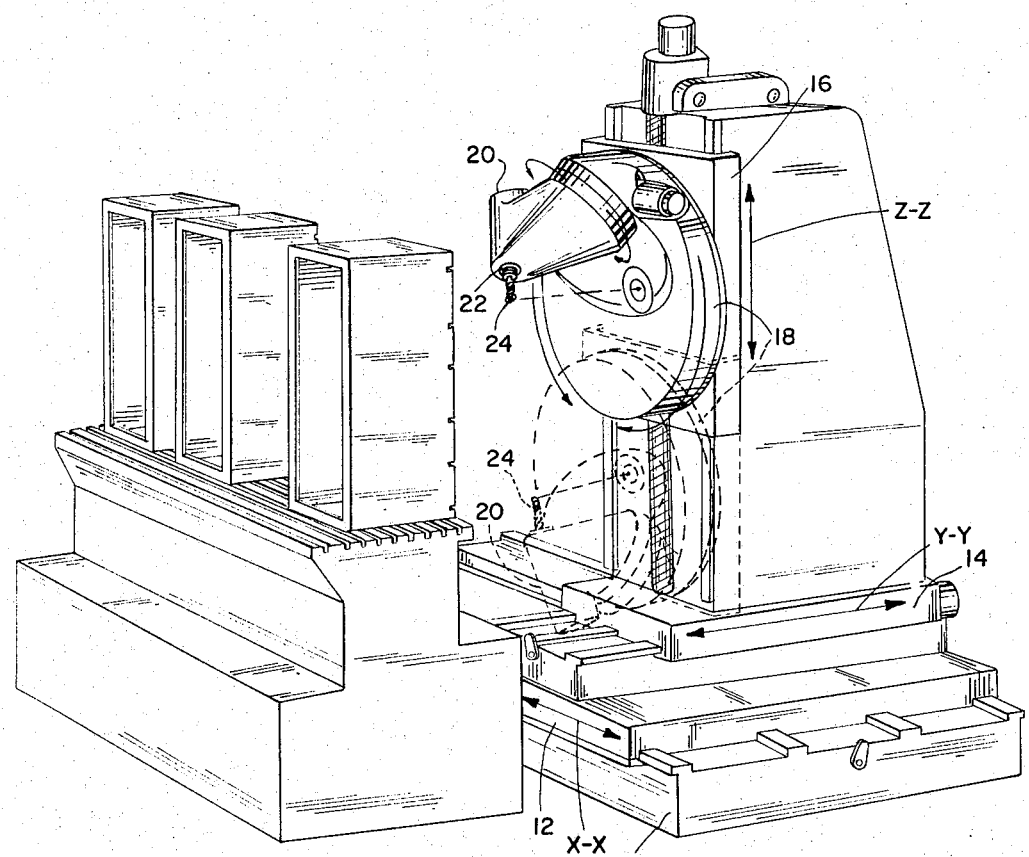
Figures 2, 3:
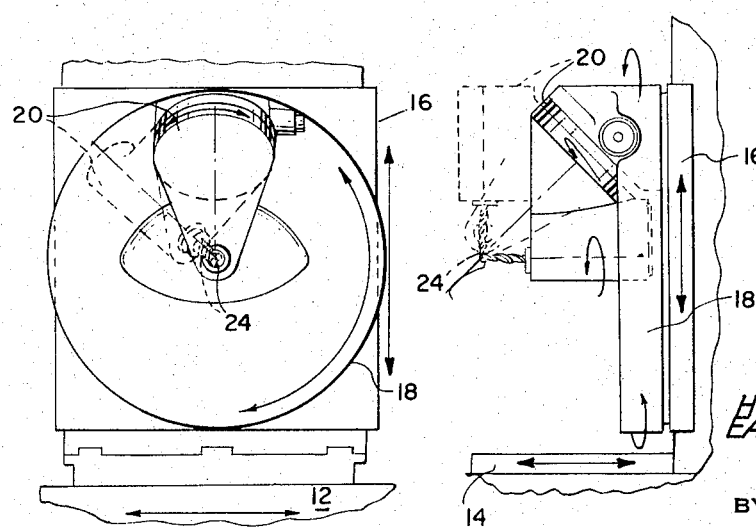

The necessary details of this machine are readily understood by reference to the three figures of drawing in which:

FIGURE 1 is a perspective view of the five axis milling machine and its associated work support; and, FIGURE 2 is a partial plan view of the secondary tool support and the associated parts illustrating detail of the tool support movement; and, FIGURE 3 is a partial end view of the secondary tool support and the associated parts illustrating detail of the tool support movement.

FIGURE 1 shows a five axis milling comprising of a base 10 which supports all of the movable parts of the milling machine. A longitudinal slide 12 is supported directly upon the base 10 and is arranged to slide along this base in the direction of an axis which has been designated the X—X axis. The longitudinal slide in turn supports a cross slide 14 which is arranged to slide along an axis which is perpendicular to the X—X axis and which has been designated the Y—Y axis. A vertical slide 16 is supported upon the cross slide and is arranged to slide along an axis which is perpendicular to both the X—X axis and the Y—Y axis and which has been designated the Z—Z axis. Those skilled in the art will recognize that this much of the milling machine is conventional. This forms no part of the instant invention.

A secondary tool support 18 is carried by the vertical slide and is rotatable upon an axis which is perpendicular to the plane of movement of the vertical slide. This axis of rotation is thus normal to the Z—Z axis and parallel to the Y—Y axis. The secondary tool support is normally capable of rotation through the full 360 degrees around its axis.

A primary tool support 20 which actually supports and drives the cutting tool, is carried by the secondary tool support. The entire primary tool support is also rotatable about an axis and preferably through the full 360 degrees. It is necessary that the axis about which the primary tool support rotates be arranged at an angle (for example, approximately a 45 degree angle) to the plane of rotation of the secondary tool support 18 or to the plane of movement of the vertical slide 16.

A rotary cutting tool driving means 22 is incorporated in the primary tool support 20 and serves to rotationally drive and position the actual cutting tool 24. The axis of the rotating tool driving means, when extended, intersects the axis of rotation of the secondary tool support when it is extended. The cutting tool is mounted in the rotary tool driving means so that the working portion of the tool is located at the intersection of the axes of rotation of the tool driving means and the secondary tool support.

It will be noted that FIGURE 1 depicts the vertical slide in two positions one of which is shown in dotted lines. Each of these positions of the vertical slide also shows the secondary tool support in a separate position.

FIGURES 2 and 3 have been added to more clearly illustrate the movements possible of the secondary tool support and the primary tool support. These drawings clearly illustrate the intersecting relationship between the axis of the rotational tool driving means and the axis of rotation of the secondary tool support.

It is now apparent that the position of the actual cutting portion or end of the tool is responsive only to the combined position of the longitudinal slide, the cross slide and the vertical slide. Once these three members are fixed in their selected positions upon their respective X—X, Y—Y and Z—Z axes, the position of the working portion of the tool is also fixed. This fixed position in space of the working portion of the tool remains fixed regardless of the movement of either or both of the secondary tool support or the primary tool support about their axes. Any possible combination of angular displacements of the secondary tool support and the primary tool support will leave unaffected the location of the cutting portion of the tool albeit the axis of the tool will gyrate widely and assume a large variety of angles of presentation to the work piece.

The relationship between the moving parts of the milling machine and the work support is shown in FIGURE 1. Those familiar with the operation of contouring machines of this general nature will immediately appreciate the advantage of the capability of altering the angle of the cutting tool to the work without at the same time altering the position in space of the working face of the tool. This confers upon the operator the capability of independently and simultaneously altering the angle with respect to the work and the position of the point of the tool in space. This capability is particularly useful when combined with a cutting tool having a ball pointed working surface.

We claim as our invention:

1. A milling machine comprising a base, a longitudinal slide adjustable along the X—X axis and supported upon said base, a cross slide adjustable along the Y—Y axis and supported upon the longitudinal slide, a vertical slide adjustable along the Z—Z axis and supported upon the cross slide, a secondary tool support mounted rotatably upon the vertical slide with its axis of rotation vertical to the plane of movement of the vertical slide, a primary tool support rotatably mounted upon the secondary tool support with its axis of rotation arranged at approximately a 45 degree angle to the plane of movement of the vertical slide and a rotary tool driving means incorporated in the primary tool support, the axis of the rotary tool driving means extended intersecting the axis of rotation extended of the secondary tool support, the angle formed by said tool axis with respect to the axis of rotation of said primary tool support being approximately 45°.

2. A milling machine comprising a base, a longitudinal slide adjustable along the X—X axis and supported upon said base, a cross slide adjustable along the Y—Y axis and supported upon the longitudinal slide, a vertical slide adjustable along the Z—Z axis and supported upon the cross slide, a secondary tool support mounted rotatably upon the vertical slide with its axis of rotation vertical to the plane of movement of the vertical slide, a primary tool support rotatably mounted upon the second tool support with its axis of rotation arranged at approximately a 45 degree angle to the plane of movement of the vertical slide and a rotary tool driving means incorporated in the primary tool support, the axis of the rotary tool driving means extended intersecting the axis of rotation extended of the secondary tool support, said rotary tool axis forming an angle of approximately 45° with respect to the axis of said primary tool support, said rotary tool driving means supporting and driving a rotary cutting tool with the center of the cutting portion of the rotary cutting tool located at the common intersection of the axis of the tool driving means and the axis of the secondary tool support.

3. A milling machine comprising a base, a longitudinal slide adjustable along the X—X axis and supported upon said base, a cross slide adjustable along the Y—Y axis and supported upon the longitudinal slide, a vertical slide adjustable along the Z—Z axis and supported upon the cross slide, a secondary tool support mounted rotatably upon the vertical slide with its axis of rotation vertical to the plane of movement of the vertical slide, a primary tool support rotatably mounted upon the secondary tool support with its axis of rotation arranged at approximately a 45 degree angle to the plane of movement of the vertical slide and a rotary tool driving means incorporated in the primary tool support, the axis of the rotary tool driving means extended intersecting the axis of rotation extended of the secondary tool support, said rotary tool driving means supporting and driving a rotary ball pointed cutting tool with the center of the cutting portion of the rotary ball pointed cutting tool located at the common intersection of the axis of the tool driving means and the axes of the secondary and primary tool supports, the angle formed by the axis of said rotary tool and said primary tool support axis being approximately 45°.

References Cited
UNITED STATES PATENTS

| | | | |
|---|---|---|---|
| 2,619,879 | 12/1952 | Hosea | 90—17 |
| 2,812,694 | 11/1957 | Reichard et al. | 90—13.1 |
| 2,978,964 | 4/1961 | Wildhaber | 90—5 |
| 3,137,206 | 6/1964 | Kirichi Shinjo | 90—5 |
| 3,213,755 | 10/1965 | King | 90—5 |
| 3,276,327 | 10/1966 | Arrowsmith et al. | 90—13 |

GERALD A. DOST, *Primary Examiner.*